US008381219B2

(12) United States Patent
Boris

(10) Patent No.: US 8,381,219 B2
(45) Date of Patent: Feb. 19, 2013

(54) MONITORING PERFORMANCE ON WORKLOAD SCHEDULING SYSTEMS

(75) Inventor: Sergej Boris, Frankfurt am Main (DE)

(73) Assignee: International Business Machines Corporation, Armonk, NY (US)

( * ) Notice: Subject to any disclaimer, the term of this patent is extended or adjusted under 35 U.S.C. 154(b) by 1184 days.

(21) Appl. No.: 12/015,798

(22) Filed: Jan. 17, 2008

(65) Prior Publication Data

US 2008/0189712 A1 Aug. 7, 2008

(30) Foreign Application Priority Data

Feb. 2, 2007 (EP) .................................... 07101633

(51) Int. Cl.
*G06F 9/46* (2006.01)
*G06F 9/30* (2006.01)
*G06F 11/00* (2006.01)

(52) U.S. Cl. ........ 718/103; 718/104; 718/102; 712/201; 370/252

(58) Field of Classification Search .......... 1/1; 718/104, 718/102; 712/201; 370/252
See application file for complete search history.

(56) References Cited

U.S. PATENT DOCUMENTS

| 6,591,262 | B1 * | 7/2003 | MacLellan et al. | 1/1 |
| 7,286,485 | B1 * | 10/2007 | Ouellette et al. | 370/252 |
| 7,302,450 | B2 * | 11/2007 | Benedetti et al. | 1/1 |
| 2005/0132167 | A1 * | 6/2005 | Longobardi | 712/201 |
| 2007/0016907 | A1 * | 1/2007 | Benedetti et al. | 718/104 |
| 2007/0124732 | A1 * | 5/2007 | Lia et al. | 718/102 |
| 2007/0234365 | A1 * | 10/2007 | Savit | 718/104 |
| 2008/0313643 | A1 * | 12/2008 | Longobardi | 718/104 |

OTHER PUBLICATIONS

Tivoli Workload Scheduler, Mar. 2000, IBM, Version 7.*
Getting Started with Tivoli OPC, Dec. 1999, IBM, Third Edition and Version 2 Release 3.*
IBM Corp., IBM Tivoli Workload Scheduler, Reference Guide, Third Edition, Version 8.2, (Revised Dec. 2004) SC32-1274-02, copyright 1999, 2004, 337 pages.
IBM Corp., IBM Tivoli Workload Scheduler, Administration and Troubleshooting, Third Edition, Version 8.2, (Revised Dec. 2004) SC32-1275-02, copyright 1991, 2004, 165 pages.
IBM Corp., IBM Tivoli Workload Scheduler, Planning and Installation Guide, Third Edition, Version 8.2, (Revised Dec. 2004) SC32-1273-02, copyright 1991, 2004, 169 pages.

* cited by examiner

*Primary Examiner* — Chun Cao
*Assistant Examiner* — Aurel Prifti
(74) *Attorney, Agent, or Firm* — Patrick J. Daugherty; Driggs, Hogg, Daugherty & Del Zoppo Co., LPA

(57) ABSTRACT

The present invention relates to the field of enterprise network computing. In particular, it relates to a method and respective system for monitoring workload of a workload scheduler. Information defining a plurality of test jobs of low priority is received. The test jobs have respective launch times, and the test jobs are launched for execution in a data processing system in accordance with said launch times and said low execution priority. It is evaluated how many of said test jobs are executed within a pre-defined analysis time range. A performance decrease warning is issued, if the number of executed test jobs is lower than a predetermined threshold number. The workload scheduler discards launching of jobs having a low priority when estimating that a volume of jobs submitted with higher priority is sufficient to keep said scheduling system busy.

17 Claims, 8 Drawing Sheets

```
* TESTSCHEDULE
SCHEDULE DZMESM011#TEST_EVERY
    ON   EVERYDAY
    UNTIL  0555
    PRIORITY 1
:
  TESTS10 DOCOMMAND "sleep 10"
    STREAMLOGON "maestro"
    DESCRIPTION "sleep 10"
    EVERY  05
```

FIG. 5

```
01: MHOME=/applications/maestro1/maestro
02: BIN="$MHOME/bin"
03: MLOG_DAY=$MHOME/stdlist/logs/`$BIN/datecalc today - 1 days pic YYYYMMDD`_TWSMERGE.log 04: # Performance Analysis
05: echo "\n** Performance Analyse *******************************************"
06: echo "* Job TEST_EVERY.TESTS10 starts every 5 min.                    *"
07: echo "* This way it schould be launched 12 times per hour.            *"
08: echo "* If it does not - it indicates a performance problem on the Master *"
09: echo "*****************************************************************"

10: cd $MHOME/stdlist/logs
11: echo "Time interval    All Jobs   TEST_EVERY Jobs   Performance"
12: for HOUR in 06 07 08 09 10 11 12 13 14 15 16 17 18 19 20 21 22 23 00 01 02 03 04 05
13: do
14:   JOBCOUNT=`grep "^$HOUR:[0-9][0-9]:.. ........|BATCHMAN:Received BI:" $MLOG_DAY | grep "#TEST_EVERY.TESTS10" | wc -l`
15:   ALLCOUNT=`grep "^$HOUR:[0-9][0-9]:.. ........|BATCHMAN:Received BI:" $MLOG_DAY | wc -l`

16:   COMMENT="  O.K."
17:   if [[ $JOBCOUNT -lt 10 ]]; then
18:     COMMENT="!!! Very bad Performance - SYSTEM IS OVERLOADED "
19:     postemsg -m " ALARM! $COMMENT on TWS Master"
20:   elif [[ $JOBCOUNT -lt 11 ]]; then
21:     COMMENT="!! Bad Performance - SYSTEM CAPACITY IS REACHED"
22:   elif [[ $JOBCOUNT -lt 12 ]]; then
23:     COMMENT="! Poor Performance - SYSTEM CAPACITY IS REACHED"
24:   fi 25:   echo "$HOUR:00:00-$HOUR:59:59   $ALLCOUNT $JOBCOUNT  $COMMENT"
26: done
```

FIG. 6

```
**** Performance Analyse *******************************************
* Job TEST_EVERY.TESTS10 starts every 5 min.              *
* This way it schould be launched 12 times per hour.      *
* If it does not - it indicates a performance problem on the Master  *
*********************************************************************
Time interval    All Jobs  TEST_EVERY Jobs   Performance
26-Jan-06  / 05:55:00 : Mastter continuesly tries to link 11 fault CPUs - performance goes down!
06:00:00-06:59:59      44       6   !!! Very bad Performance
07:00:00-07:59:59      1015     9   !!! Very bad Performance
08:00:00-08:59:59      1949     9   !!! Very bad Performance
09:00:00-09:59:59      2650     8   !!! Very bad Performance
10:00:00-10:59:59      3095     8   !!! Very bad Performance
11:00:00-11:59:59      3078     7   !!! Very bad Performance
12:00:00-12:59:59      3095     8   !!! Very bad Performance
13:00:00-13:59:59      5452     6   !!! Very bad Performance
14:00:00-14:59:59      5684     9   !!! Very bad Performance
15:00:00-15:59:59      7208     10  !!  Bad Performance
26-Jan-06  / 15:36:00 : Unlink fault CPUs
16:00:00-16:59:59      9017     12  O.K.
17:00:00-17:59:59      9266     12  O.K.
18:00:00-18:59:59      9342     12  O.K.
19:00:00-19:59:59      9348     12  O.K.
20:00:00-20:59:59      9348     12  O.K.
21:00:00-21:59:59      9341     12  O.K.
22:00:00-22:59:59      9338     12  O.K.
```

FIG. 7

Analyse the Log: /applications/maestro1/maestro/stdlist/logs/20060402_TWSMERGE.log
** Performance Analyse *************************************
* Job TEST_EVERY.TESTS10 starts every 5 min.                *
* This way it schould be launched 12 times per hour.        *
* If it does not - it indicates a performance problem on the Master  *
**************************************************************

```
Time interval      All Jobs  TEST_EVERY Jobs   Performance
06:00:00-06:59:59      63        12         O.K.
07:00:00-07:59:59      79        12         O.K.
08:00:00-08:59:59     141        12         O.K.
09:00:00-09:59:59     197        12         O.K.
10:00:00-10:59:59     241        11       ! Poor Performance
11:00:00-11:59:59     280        12         O.K.
12:00:00-12:59:59     344        12         O.K.
13:00:00-13:59:59     417        11       ! Poor Performance
14:00:00-14:59:59     481        11       ! Poor Performance
15:00:00-15:59:59     538        11       ! Poor Performance
16:00:00-16:59:59     598        12         O.K.
17:00:00-17:59:59     593        10       !! Bad Performance
18:00:00-18:59:59     658        10       !! Bad Performance
19:00:00-19:59:59     684         9       !!! Very bad Performance
20:00:00-20:59:59     723         8       !!! Very bad Performance
21:00:00-21:59:59     734         7       !!! Very bad Performance
22:00:00-22:59:59     749         0       !!! Very bad Performance
23:00:00-23:59:59     743         0       !!! Very bad Performance
```

Overload limit is reached

FIG. 8

MONITORING PERFORMANCE ON WORKLOAD SCHEDULING SYSTEMS

FIELD OF THE INVENTION

The present invention relates to the field of enterprise network computing. In particular, it relates to a method and respective system for scheduling workload on a data processing system. The data processing system may be information technology (IT) resources used in an enterprise electronic network, wherein at least a part of the workload is performed by submitting jobs for execution by a predefined IT resource.

BACKGROUND OF THE INVENTION

Prior art IT-resources in enterprise networks are subjected to continuous changes due to dynamically changing workload, increasing efforts to use the Internet and offer web based services, and due to permanently increasing storage needs. As customers deploy virtualization and grid technologies in order to help maximize their IT-investment, they also need workload scheduling programs that enable them to centrally manage and automate application workloads across heterogeneous environments.

A prior art workload-scheduling tool is provided, for example, by International Business Machines Corp. within the Tivoli product family. The available Tivoli Workload Scheduler (TWS) version at the time of writing is 8.2. A datasheet of the Tivoli Workload Scheduler can be downloaded, for example on Jan. 9, 2008 at ftp://ftp.software.ibm.com/software/tivoli/datasheets/ds-scheduler-051006.pdf. This prior art scheduler product helps to optimize storage environments and workload distribution by delivering integrated and modular solutions that simplify and automate management of workload. In particular, this prior art workload scheduler product automates, monitors and controls the flow of work through an enterprise's entire IT-infrastructure on both local and remote systems. This includes the management of the entire IT-processings including the management of batch jobs.

The Tivoli Workload Scheduler allows planning jobs for execution, resolves interdependencies between jobs and other processing tasks and launches and tracks each job. FIG. 1 shows a prior art TWS processing in general. A TWS Master 12 creates a scheduling plan and controls a job's launching and status on TWS Agents 14 according to this plan. A TWS Agent 14 is a TWS client implementable on any machine or application, which locally executes the control determined by the central Master 12. Agents 14 report to the Master 12 about the status of their jobs. In case of failure, the Master 12 indicates warnings by means of its Alarm System 15.

It is typical that enterprises extend the hardware constellation in their enterprise data processing environments where workload scheduler products are employed. Such extension is manifested by an increasing number of Agents 14 to be included into a Scheduling System and an increasing number of Jobs, which are to be taken under control of the workload scheduler (scheduling system). A scheduling system (workload scheduler) here refers to a workload management solution having typically a number of agents 14 and a central master 12. The scheduling system controls various resources in a data processing system or, in other words, in a computing system.

As a result of extending the Scheduling System, system administrators may be suddenly confronted with negative side effects such as too long response times of the system, a delay when launching important jobs, etc. The system performance deterioration may be completely unexpected for system administration staff.

Thus, there is a need for improved methods and systems that address the above problems, as well as others.

SUMMARY OF THE INVENTION

One objective of the present invention to provide a method and system for monitoring workload of a Scheduling System, which method is able to determine a tendency of the scheduling system to suffer from a performance decrease.

According to a first aspect of the invention, a method and respective system is disclosed monitoring workload of a scheduling system, said method comprising the steps of: receiving information defining a plurality of test jobs, said test jobs having respective launch times and a low priority within said scheduling system, launching said test jobs for execution in a data processing system in accordance with said launch times and said low priority, evaluating how many of said test jobs are executed within a pre-defined analysis time range in said data processing system, and issuing a performance decrease warning, if the number of executed test jobs is lower than a predetermined threshold number, wherein said scheduling system drops launching of low priority jobs when finding that a volume of jobs handled with higher priority is sufficient to keep said scheduling system busy.

In another aspect, method or systems are provided, and methods and systems are deployed for providing scheduling system workload monitoring, comprising defining a plurality of low priority test jobs, each having a respective launch time; launching the low priority test jobs on a data processing system as a function of each respective launch time; determining a total number of the test jobs executed within a pre-defined analysis time period by the data processing system; and issuing a performance decrease warning if the determined total number of executed test jobs is lower than a first predetermined threshold number associated with the time period, wherein said scheduling system is configured to handle high priority jobs prior to handling low priority jobs and to drop launching of low priority jobs as a function of high priority job loading. In some methods and systems, launching low priority test jobs comprises launching the jobs in predetermined time intervals.

In some embodiments, scheduling systems drop jobs having a priority lower than a lowest priority of a job within a set of high priority jobs, wherein the scheduling system estimates the set of high priority jobs to have a sufficient volume for the data processing system. In some embodiments, low priority test jobs run without causing a load to a data processing system. And in some embodiments, the scheduling system adds jobs to a queue in an order as a function of relative job priority by pushing higher priority jobs upward over low priority jobs, processes jobs according to their queue priority from a top of the queue, and drops low priority tests from a bottom of the queue in response the queue growing over a buffer limit.

Scheduling systems are provided comprising a programmable system master comprising a workload monitor; a plurality of client computer agents in communication with the system master; and a memory in communication with the system master, the memory comprising a plurality of low priority test jobs, each of said test jobs having a respective launch time; wherein the system master is configured to launch the plurality of low priority test jobs on the client computer agents as a function of each respective launch time, the workload monitor is configured to determine a total number of the test jobs executed within a pre-defined analysis time period by the client computer agents and issue a performance decrease warning if the determined total number of executed test jobs is lower than a first predetermined threshold number associated with the time period, and the scheduling system is configured to handle high priority jobs prior to handling low priority jobs and to drop launching of low priority jobs as a function of high priority job loading.

Some systems comprise a queue, wherein the system master is configured to add jobs to the queue in an order as a function of relative job priority by pushing higher priority jobs upward over low priority jobs; process jobs according to their queue priority from a top of the queue; and drop low priority test jobs from a bottom of the queue in response the queue growing over a buffer limit. And in some systems, the workload monitor is configured to keep a low priority job execution log file, and to determine the total number of the test jobs executed within the pre-defined analysis time period by evaluating the job execution log file.

Further aspects of the invention provide a monitoring component for a scheduling system, a scheduling system having the monitoring functionality and a computer program product.

BRIEF DESCRIPTION OF THE DRAWINGS

The present invention is illustrated by way of example and is not limited by the shape of the figures of the drawings in which:

FIG. 5 shows an exemplary definition of a test job implementation according to the present invention.

FIG. 6 shows an exemplary definition of a job implementation making some log file analysis according to the present invention.

FIG. 7 shows an exemplary output of the analysis job of FIG. 6, in a first situation.

FIG. 8 shows an exemplary output of the analysis job of FIG. 6, in a second situation.

DETAILED DESCRIPTION OF THE INVENTION

Figure 1:
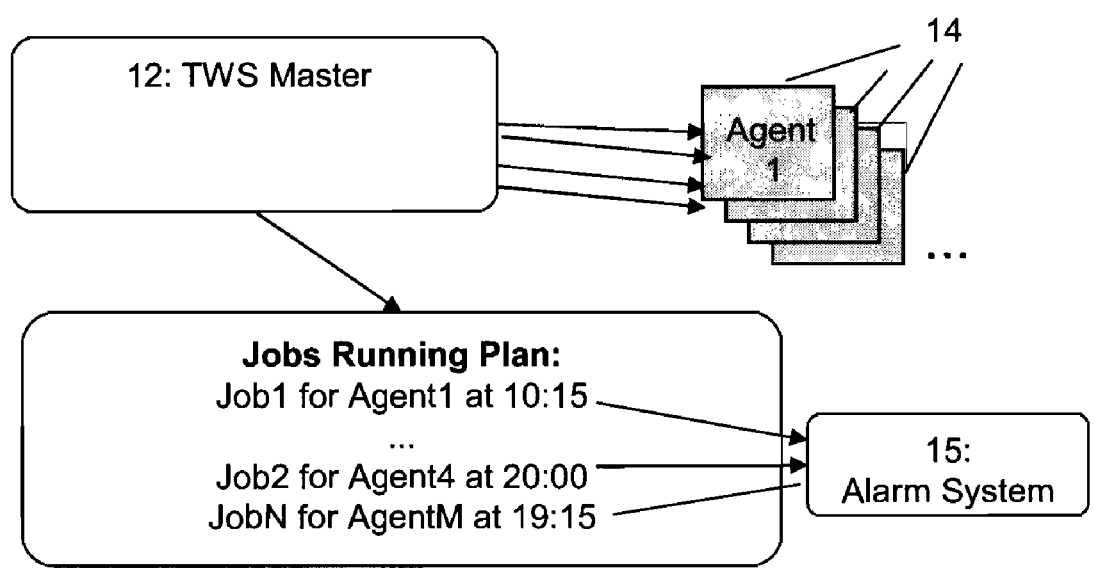
FIG. 1 illustrates basic structural components of a prior art hardware and software environment used for a prior art method.

The present invention discloses a method and respective system for monitoring workload of a scheduling system, which method is able to indicate the beginning and further development of performance weakness of the scheduling system. The performance of a scheduling system is monitored typically by defining repeated launching of a test job of low priority and evaluating whether the test jobs are launched as specified. A scheduling system possesses its own priority mechanism which controls the launching of jobs. The launched jobs may be executed in the data processing system, for example, using a default execution priority or an execution priority defined specifically for the jobs. By setting a low (launching) priority for a job in the scheduling system, one defines an order of launching jobs: a job of highest priority will be handled first. The low priority of a test job refers typically to the smallest priority value in the scheduling system. Simple test jobs are used which do not consume major resources in the data processing system during execution, such as central processing unit (CPU) or storage resources. Test jobs may be launched in predetermined time intervals, such as every five minutes one job. In one embodiment the log file is analyzed, in which data are collected telling, when a job was launched.

The dropping of launching of low priority jobs when finding that a volume of jobs handled with a higher priority is sufficient to keep said scheduling system busy refers to the following. Those jobs are dropped that have a priority lower than a lowest priority within a set of high priority jobs estimated to have a volume sufficient to keep said scheduling system.

The test jobs may execute a dummy command (e.g. "sleep 10" causing the data processing system to wait 10 seconds before proceeding), which does not cause load to the data processing system where they are run on. The aim here is to test the load of the scheduling system, not of the data processing system. In other words, it is monitored whether the scheduling system is able to launch the test jobs at the defined launch times.

Estimating whether the number of already launched jobs would keep the scheduling system busy is performed by using a feature typically present in every queued system. The scheduling system pushes activities of higher priority in a queue forward and processes them according to their priority until a new group of activities comes and is added to the queue in accordance with their priorities. Then the scheduling system starts to processes activities from the top. This way, if the scheduling system is overload with activities, activities (here job launching) of low priority can not be reached for processing. As far as the queue buffer in the scheduling system is not unlimited, activities of a low priority will be dropped as soon as the queue grows over the buffer.

If a symptom of the performance problem rises on a scheduling system, one should first of all stop to load the scheduling system with further activities to avoid its breakdown. One should look for the narrow bottle necks of system and hardware of scheduling system server and upgrade the respective resources to more powerful resources, for example, by using a more powerful server.

The performance of the scheduling system may be affected by a number of IT resources, such as plurality of servers of different types under control, batch job management, network capacity, storage devices, CPU resources etc. At least a part of the workload of a Scheduling System is performed by handling jobs (submitting for execution, checking a status, finalizing).

In a scheduling system, where the present invention is applicable, jobs having a low priority are not handled before any other jobs having a higher priority have been fully processed in the scheduling system. It is, therefore, possible to derive from the number of test jobs executed in a certain time window, such as one hour, for example, if the scheduled system has a tendency of decreasing performance. It should be noted that often workload management systems do not at all process low priority jobs, if a respective number of higher priority jobs must be processed for execution and the number of such higher priority jobs is high enough to keep the system under full operation with this higher priority jobs. Then, for example, instead of 12 low priority jobs, which is to be expected when every 5 minutes a test job is launched and the time window is one hour, only a number of 10, 9, 8, . . . , 2, 1 or 0 test jobs will be launched in this time window. It should be noted that this basic procedure is in particular suited to catch all those mission-critical situations, in which a Scheduling System begins to decrease in performance. In other words, the workload in the system reaches the 100% system workload capacity.

To evaluate the log file in order to count the number of executed test jobs is advantageous because this is a simple method and the log file is open to be accessed by the workload scheduling program itself. So, if the test jobs are identified by means of a unique job-ID, this job-ID can be easily searched for automatically during evaluation.

In one aspect, methods are based on the particular feature of the Job launching mechanism and is sensitive just and exclusively to the performance of Jobs launching mechanism. The method indicates an alarm situation on the workload scheduling system in general—bottlenecks of all subsystems may be investigated in separate tasks.

Figure 2:
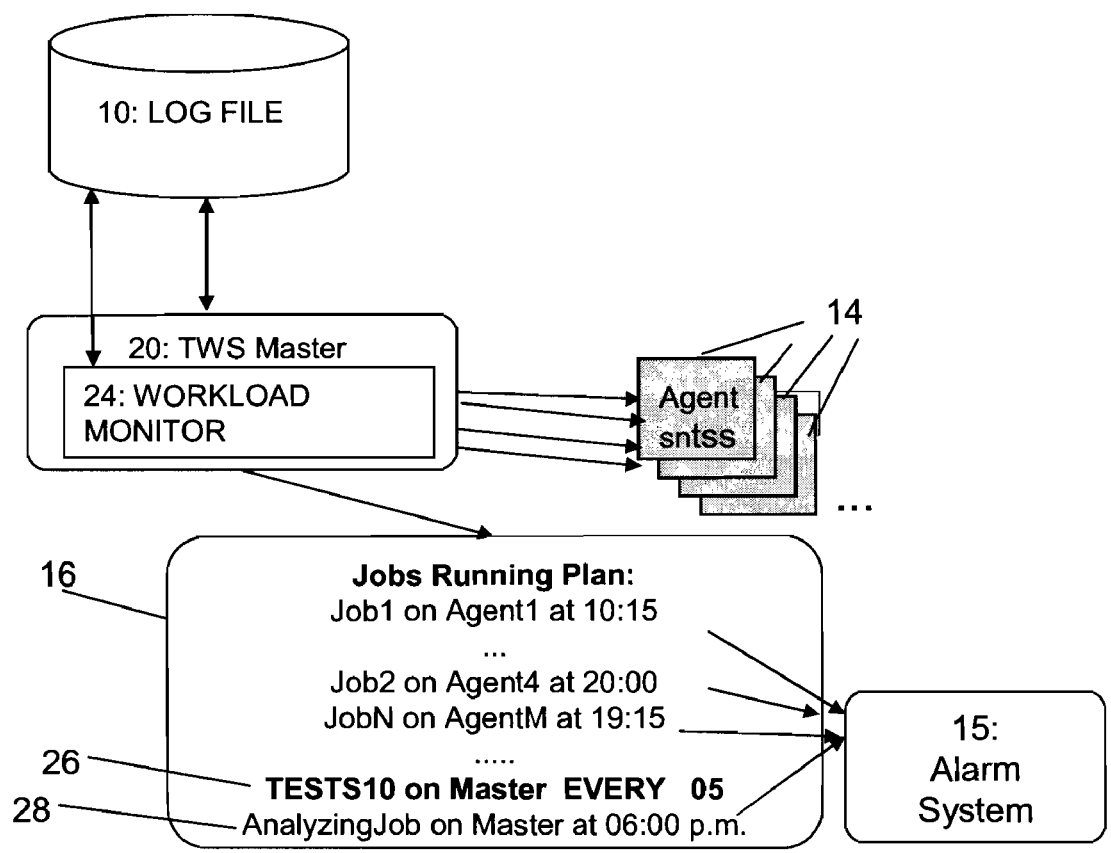
FIG. 2 illustrates the basic structural components of a hardware and software environment according to the present invention.

With general reference to the figures and with special reference now to FIG. 2, a Tivoli Workload Scheduler is used in the following as an example of a workload scheduler (scheduling system) in accordance of an embodiment of the present invention. In FIG. 2, a TWS master 20 is connected in the architectural hardware/software configuration scheme as it was described before with reference to FIG. 1. According to this embodiment of the invention, a workload monitoring program component 24 generates and includes an additional entry 26 into the jobs running plan 16. The entry 26 defines that a test job having the lowest priority available should run on the master at predefined time instances, typically periodically. In this example, the test job is to be run every five minutes ("EVERY 05" in the entry 26).

An exemplary test job definition is given in FIG. 5. The definition in FIG. 5 is in TWS configuration language. In one embodiment the test job named TESTS10 is to be run every day all the time the scheduler is working. In FIG. 5, it is defined that the test job is scheduled until 05:55 AM, as in this example it is assumed that a production day (when the definition of the test jobs is input to the scheduler) starts at 06:00 AM. The priority of the test job is set to 1, which means the lowest possible priority level. It will execute a UNIX command "sleep 10" (DOCOMMAND "sleep 10") under maestro user ("streamlogon maestro").

Additionally, an analyzing job is defined in the job running plan by another entry 28 in the jobs running plan. FIG. 6 gives further details of the procedure executed by analyzing job in the UNIX scripting language. This analyzing procedure basically counts the number of test jobs, which were executed in each hour during a Production Day.

Figure 3:
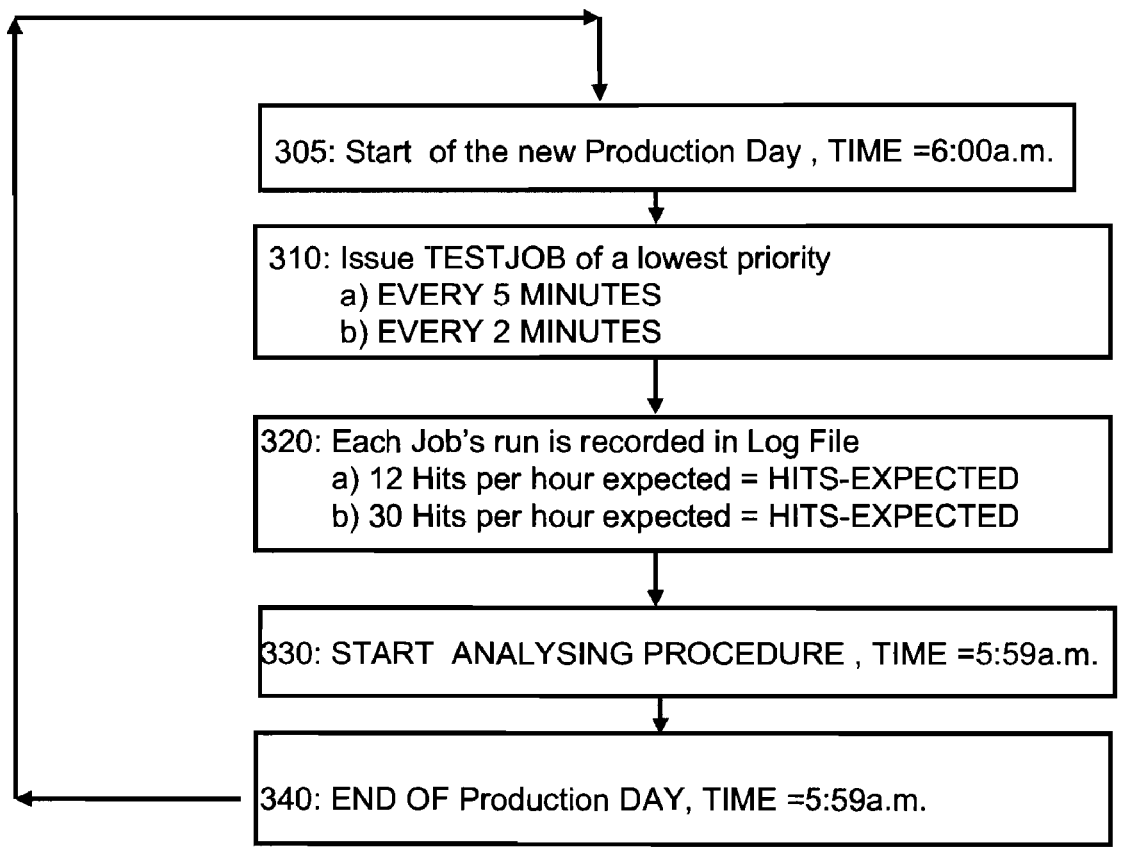
FIG. 3 illustrates control flow according to the present invention.

With reference back to FIG. 3, the control flow comprising the steps of a method, in one embodiment as implemented in the workload monitoring component 24, will be described in more detail. In step 305, the workload monitoring component 24 starts a new production day, for example, at 6:00 AM. The test job, which was described above, is planned to be launched every five minutes during the whole day from 6:00 until 5:55 o'clock (step 310). Thus, the first job is issued at 6:00 o'clock in the morning by the start of the new Production Day (step 305). Step 310 launches the same test job periodically, in this example twelve times per hour. Each Job's run is recorded in a Log File (step 320). Thus, twelve records of Test Job per hour in Log File are expected. In step 310, also different further definitions can be applied. It is exemplarily shown also in FIG. 3, that every two minutes a test job is launched. Thus, 30 records of Test Job per hour in Log File are expected.

Shortly before the end of the day (5.59 a.m. in step 340) has been reached, the analysis of logged information is carried out (step 330). As a further option, it is possible that the analysis is carried out not in one single go, but in a number of steps. For example, the analysis can be carried out periodically during the production day, say, once in an hour.

Figure 4:
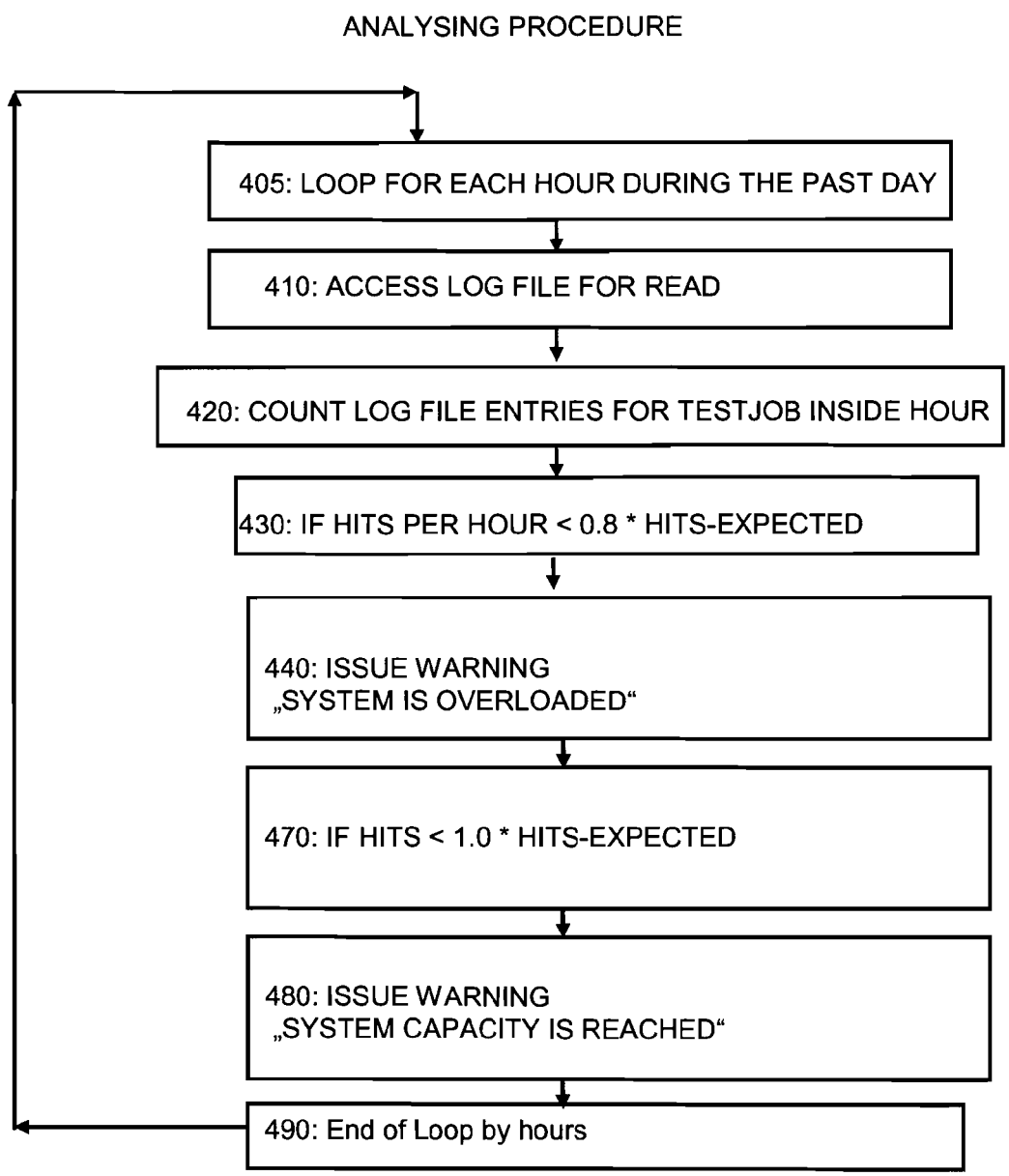
FIG. 4 illustrates control flow during analysis of a log file according to the present invention.

FIG. 4 represents an ANALYSING PROCEDURE performed also by the workload monitoring component 24. The log file is accessed in a step 410 in order to check how many of the test jobs have been executed within the each hour time windows. Thus, the procedure uses some text parser during a subsequent analysis step 420, in order to extract those entries in the log file, which belong to a respective one of the test jobs recorded during step 320.

As a test job can be identified by a respective job-ID, those jobs can be easily grouped and counted. Those counts are referred to as "hits" in FIG. 3. The number of expected hits is printed exemplarily for some different launching frequencies for the test jobs within the block of step 320.

In a next step 430, the number of accumulated hits found during the log analysis step 420 is compared to the predefined parameter "HITS-EXPECTED". If the number of accumulated hits is smaller than this parameter "HITS-EXPECTED", then in a further step 360 a warning message is issued to the system administration staff telling that the available system capacity has been reached. In this variant, a distinction between 0.8×HITS-EXPECTED and 1.0×HITS-EXPECTED is done. In case the number of accumulated hits is smaller than 0.8×HITS-EXPECTED, see decision 430, a warning message is issued in a subsequent step 440 telling that the system is overloaded. In a subsequent step 470, which is only performed when step 440 is not performed, and if the number of hits remains to be smaller than the parameter 1.0×HITS-EXPECTED, then the earlier mentioned warning message is issued, "system capacity is reached", see step 480. A person skilled in the art may appreciate, that it is easily possible to implement even finer criteria, as for example 50%, 60%, 70%, 80%, 90% and 100% of HITS-EXPECTED. Respective specific warning messages can then be generated automatically.

Details of the ANALYSING PROCEDURE are given with reference to FIG. 6, which illustrates an example how to analyze the log file for the executed jobs. The lines have the following meanings. In the first row of FIG. 6 a MHOME variable defines a home directory for TWS user. Line2: BIN defines TWS binaries. Line3: MLOG_DAY defines today's Log File for analysis. Line4-9: output comments. Line10: move to Logs directory. Line11: output headline. Line12-13: DO loop by hours from 6:00 to 5:00. Line14: count in the Log File Test Job HITS recorded during correspondent hour=JOBCOUNT. Line15: count in the Log File every job HITS recorded during correspondent hour=ALLCOUNT. Line16-24: rate the result count. Line19: in the case of Performance degree evidence send Alarm Message to the Alarm System. Line26: output the result. Line27: end of DO cycle.

With reference to examples of FIGS. 7 and 8, to test the method implemented in a respective performance monitoring tool, the TWS system was artificially subjected to factors which repress scheduling system performance. As an example, in FIG. 7 the Master had a trouble connecting to a number of TWS Agents (CPUs) and spent a high degree of capacity resources on this activity. The general performance of the TWS system was observed to go down. This effect can be seen in FIG. 7 from 6:00 until 15:36. After "Unlink fault CPUs" at 16.00 and later, the TWS Master did not try any more to connect fault Agents and showed a satisfying performance, as all test jobs—namely 12 per hour—were executed.

In the example on FIG. 8 the TWS System was subjected to a successive loading with more jobs per hour (second column) until it was overloaded.

In more detail and with reference to FIG. 7, an exemplary analysis result is depicted in which for each complete hour an analysis result is generated. The first column of FIG. 7 is the definition of the time window in question and valid for this row. The second column is the number of total jobs launched within the before mentioned time range (first column), the third row is the number of test jobs executed within the before mentioned time range (first column) and the last row is the content of the warning message in this example. For example, between 6.00 a.m. and 7.00 a.m., only a number of 6 test jobs are executed. As in this case, every five minutes a test job was launched, the parameter HITS-EXPECTED is 60 minutes/5 minutes=12. So, one can derive that in this time window so many higher priority jobs must have been executed that there was no time available to execute the full, complete number of launched low priority test jobs. Thus, it can be further derived that the system performance is very bad. This is printed out in the last column.

Further rows between 7.00 a.m. and 15.00, i.e. 3.00 p.m. show a number of executed low priority test jobs varying between 6 and 9 per hour. This range is coupled with the content of the warning message "very bad performance". In this implementation, if the number of test jobs performed in one hour is either 10 or 11, then the performance is not so bad as in the before mentioned cases, but not good enough. Thus, a respective content of the warning message is "bad performance".

Further, between 16.00 and 19.00, the number of executed test jobs was 12 in each hour. Thus, the system load was low enough in order to execute even the complete number of low priority jobs. So, one can again derive that all other jobs having higher priority have been completely executed. Thus, the message been output by the method is something like "system load is beneath maximum capacity", or just "OK". The same is true for the hours between 19.00 and 23.00.

FIG. 8 gives a further example with an evaluation table having the same structure as that one of FIG. 6. Here, the distinction is made between 0 and 9 jobs per hour yielding a warning message "very bad performance", a number of 10 yielding "bad performance", a number of 11 yielding "poor performance" and the number of 12 yielding a message "OK". In this case, some overload limit can be assigned to a number of 9 or less test jobs per hour. This often correlates with the number of all jobs, which is printed in the respective second column of FIGS. 6 and 7.

A person skilled in the art may appreciate that the method in accordance of an embodiment of the invention sensitively recognizes the very point in time from which on the performance of the system is poor due to an overload of scheduled jobs. The reason behind may be for example that the maximum number of driven objects like jobs, job streams, file dependency etc. is exceeded; or, a plurality of agents 14, refer back to FIG. 2, have communication problems and influence by that the general performance on the master system.

The invention can take the form of an entirely hardware embodiment, an entirely software embodiment or an embodiment containing both hardware and software elements. In one embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters. In the appended claims a computerized method refers to a method whose steps are performed by a computing system containing a suitable combination of one or more processors, memory means and storage means.

Figure 9:
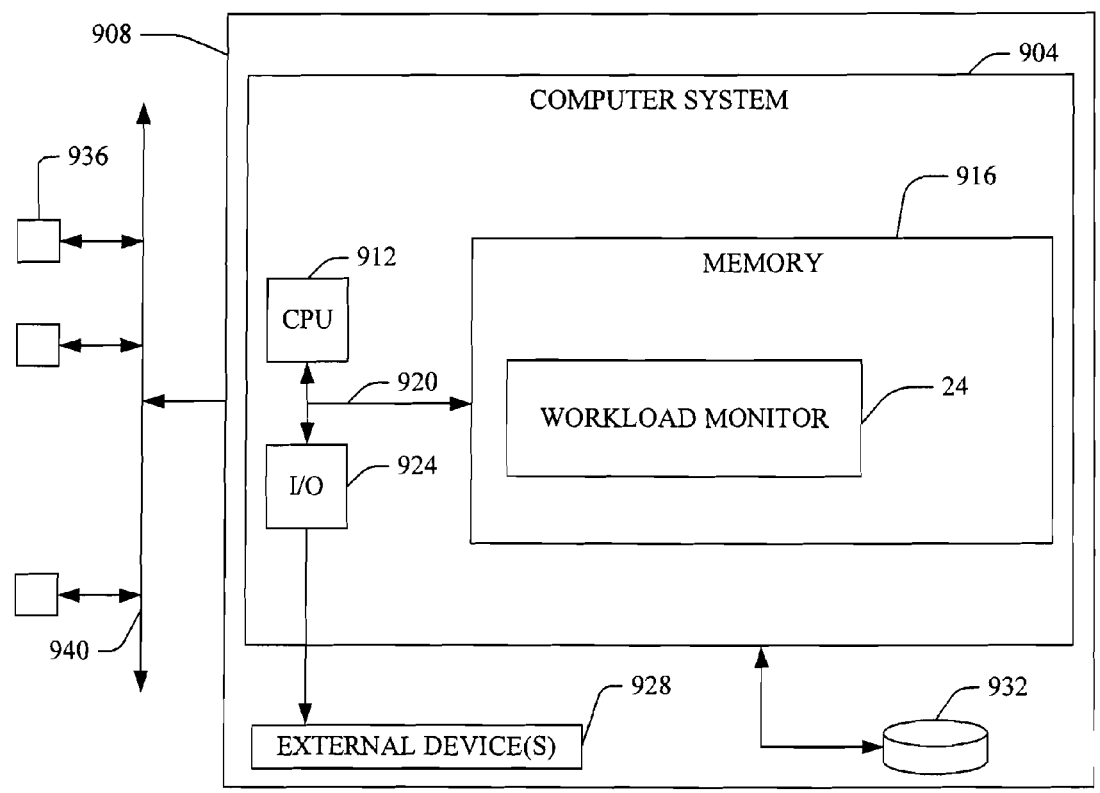
FIG. 9 is a block diagram illustrating an exemplary computerized implementation of a system and method according to the present invention.

FIG. 9 illustrates an exemplary computerized implementation of the present invention including a computer system 904 deployed within a computer infrastructure 908, such as a computer. This is intended to demonstrate, among other things, that the present invention could be implemented within a network environment 940 (e.g., the Internet, a wide area network (WAN), a local area network (LAN), a virtual private network (VPN), etc.) in communication with one or more additional computers 936, or on a stand-alone computer system 908. In the case of the former, communication throughout the network 940 can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

As shown, the computer system 904 includes a central processing unit (CPU) 912, a memory 916, a bus 920, and input/output (I/O) interfaces 924. Further, the computer system 904 is shown in communication with external I/O devices/resources 928 and storage system 932. In general, the processing unit 912 executes computer program code, such as the code to implement the workload monitor component 24 illustrated in FIG. 2 and described above, which is stored in memory 916 and/or storage system 932.

While executing computer program code, the processing unit 912 can read and/or write data to/from the memory 916, the storage system 932, and/or the I/O interfaces 924. The bus 920 provides a communication link between each of the components in computer system 904. The external devices 928 can comprise any devices (e.g., keyboard, pointing device, display, etc.) that enable a user to interact with computer system 904 and/or any devices (e.g., network card, modem, etc.) that enable computer system 904 to communicate with one or more other computing devices.

The computer infrastructure 908 is only illustrative of various types of computer infrastructures for implementing the invention. For example, in one embodiment, computer infrastructure 908 comprises two or more computing devices (e.g., a server cluster) that communicate over a network to perform the various process steps of the invention. Moreover, computer system 904 is only representative of various possible computer systems that can include numerous combinations of hardware.

To this extent, in other embodiments, the computer system 904 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively. Moreover, the processing unit 912 may comprise a single processing unit, or be distributed across one or more processing units in one or more locations, e.g., on a client and server. Similarly, the memory 916 and/or the storage system 932 can comprise any combination of various types of data storage and/or transmission media that reside at one or more physical locations.

Further, I/O interfaces 924 can comprise any system for exchanging information with one or more of the external device 928. Still further, it is understood that one or more additional components (e.g., system software, math co-processing unit, etc.) not shown in FIG. 9 can be included in computer system 904. However, if computer system 904 comprises a handheld device or the like, it is understood that one or more of the external devices 928 (e.g., a display) and/or the storage system 932 could be contained within computer system 904, not externally as shown.

The storage system 932 can be any type of system (e.g., a database) capable of providing storage for information under the present invention. To this extent, the storage system 932 could include one or more storage devices, such as a magnetic disk drive or an optical disk drive. In another embodiment, the storage system 932 includes data distributed across, for example, a local area network (LAN), wide area network (WAN) or a storage area network (SAN) (not shown). In addition, although not shown, additional components, such as cache memory, communication systems, system software, etc., may be incorporated into computer system 904.

It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory 916 and/or the storage system 932 (e.g., a fixed disk, a read-only memory, a random access memory, a cache memory, etc.).

Still yet, computer infrastructure 908 is intended to demonstrate that some or all of the components of implementation could be deployed, managed, serviced, etc. by a service provider who offers to implement, deploy, and/or perform the functions of the present invention for others, for example by licensing methods and technology according to the present invention. In one embodiment, the invention may comprise a business method that performs the process steps of the invention on a subscription, advertising, and/or fee basis. Thus, a service provider can create, maintain, support, etc., a computer infrastructure, such as the computer infrastructure 908 that performs the process steps of the invention for one or more customers, and in return the service provider can receive payment from the customer(s) under a subscription and/or fee agreement and/or the service provider can receive payment from the sale of advertising content to one or more third parties.

In still another embodiment, the invention provides a computer-implemented method according to the present invention. In this case, a computer infrastructure, such as computer infrastructure 908, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as computer system 904, from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

While the foregoing presentation is with reference to particular embodiments of the invention, it will be appreciated by those skilled in the art that changes in these embodiments may be made without departing from the principles and spirit of the invention, the scope of which is defined by the appended claims.

I claim:

1. A method for monitoring workload of a scheduling system, comprising:

scheduling each of a total number of a plurality of test jobs in a scheduling system for execution by a data processing system within an analysis time range period, wherein each of the test jobs is scheduled to run at different respective periodic interval launch times within the analysis time range period and has a lowest priority within said scheduling system, and wherein a plurality of other jobs are scheduled in the scheduling system for execution by the data processing system within the analysis time range period and each of the other jobs have priorities that are higher than the lowest priority of the test jobs;

at an end of the analysis time range period, determining a number of said scheduled plurality of test jobs that were executed within the analysis time range period by said data processing system; and issuing a first performance decrease warning if the determined number of executed test jobs is lower than a threshold amount of the total scheduled number of the plurality of test jobs; and wherein said scheduling system adds each of the test jobs and the other jobs to a queue as a function of relative job priority by pushing higher priority jobs upward over lower priority jobs in the queue and thereby pushing each test job to a bottom of the queue, executes the test and other jobs in the data processing system in order of their queued priority at their respective launch times by launching higher priority jobs before lower priority jobs, and drops the lowest priority test jobs at the bottom of the queue from the queue as the queue grows larger than its buffer size, wherein the dropped test jobs are not launched by the data processing system; and wherein execution of each of the test jobs by the data processing system does not cause a load to a total workload capacity of the data processing system, wherein execution of each of the other jobs by the data processing system causes a load to the total workload capacity of the data processing system, and wherein all of the other jobs may be executed within the total workload capacity of the data processing system when the lowest priority test jobs at the bottom of the queue are dropped from the queue and not launched by the data processing system as the queue grows larger than its buffer size.

2. The method according to claim 1, wherein each execution of a job by the data processing system is recorded in a job execution log file, and wherein determining said number of the test jobs executed within the analysis time range period comprises counting a number of the test jobs listed as executed in said job execution log file.

3. The method according to claim 2, wherein the threshold amount of the total scheduled number of the plurality of test jobs is equal to the total scheduled number of the plurality of test jobs, the method further comprising:

issuing another performance decrease warning that is different from the first performance decrease warning if the determined number of executed test jobs is lower than another threshold number that is associated with the analysis time range period and is less than the threshold amount that is equal to the total number of the plurality of test jobs.

4. The method of claim 2, wherein the scheduling system further estimates a volume of the higher priority jobs that is sufficient to keep the data processing system busy within the total workload capacity of the data processing system, and drops lower queued jobs from the queue that exceed the estimated volume of the higher priority jobs.

5. The method of claim 4, wherein execution of each of the test jobs by the data processing system causes the data processing system to wait for a wait time interval before proceeding to execute a next job of the queued jobs.

6. The method of claim 5, wherein the lowest priority of the scheduled test jobs is a smallest priority value in the scheduling system.

7. A method for deploying a system for monitoring a workload of a scheduling system, comprising:

providing a computer infrastructure being operable to:

schedule each of a total number of a plurality of test jobs in a scheduling system to launch on a data processing system within an analysis time range period, each of the test jobs scheduled to run at different respective periodic interval launch times within the analysis time range period and having a lowest priority within said scheduling system, and wherein a plurality of other jobs are scheduled in the scheduling system for execution by the data processing system within the analysis time range period and each of the other jobs have priorities that are higher than the lowest priority of the test jobs;

determine at the end of the analysis time range period a number of the test jobs executed within the analysis time range period by the data processing system; and issue a first performance decrease warning if the determined number of executed test jobs is lower than a first predetermined threshold number that is equal to or less than the total scheduled number of the plurality of test jobs; and wherein said scheduling system adds each of the test jobs and the other jobs to a queue as a function of relative job priority by pushing higher priority jobs upward over lower priority jobs in the queue and thereby pushing each test job to a bottom of the queue, executes the test and other jobs in the data processing system in order of their queued priority at their respective launch times by launching higher priority jobs before lower priority jobs, and drops the lowest priority test jobs at the bottom of the queue from the queue as the queue grows larger than its buffer size, wherein the dropped test jobs are not launched by the data processing system; and wherein execution of each of the test jobs by the data processing system does not cause a load to a total workload capacity of the data processing system, wherein execution of each of the other jobs by the data processing system causes a load to the total workload capacity of the data processing system, and wherein all of the other jobs may be executed within the total workload capacity of the data processing system when the lowest priority test jobs at the bottom of the queue are dropped from the queue and not launched by the data processing system as the queue grows larger than its buffer size.

8. The method for deploying of claim 7, wherein the scheduling system further estimates a volume of the higher priority jobs that is sufficient to keep the data processing system busy within the total workload capacity of the data processing system, and drops lower queued jobs from the queue that exceed the estimated volume of the higher priority jobs.

9. The method for deploying of claim 8, wherein execution of each of the test jobs by the data processing system causes the data processing system to wait for a wait time interval before proceeding to execute a next job of the queued jobs.

10. The method for deploying of claim 9, wherein the lowest priority of the scheduled test jobs is a smallest priority value in the scheduling system.

11. An article of manufacture comprising:

a computer-readable tangible storage device having computer readable program code embodied therewith, the program code comprising instructions which, when executed on a computer system, cause the computer system to:

schedule each of a total number of a plurality of test jobs in a scheduling system for execution by a data processing system at different respective periodic interval launch times within an analysis time range period, each of the test jobs having a lowest priority within said scheduling system;

determine at the end of the analysis time range period a number of the scheduled test jobs that were executed within the analysis time range period by the data processing system; and issue a performance decrease warning if the determined total number of executed test jobs is lower than a first predetermined threshold number that is equal to or less than the total scheduled number of the plurality of test jobs; and wherein said scheduling system adds each of the test jobs and the other jobs to a queue as a function of relative job priority by pushing higher priority jobs upward over lower priority jobs in the queue and thereby pushing each test job to a bottom of the queue, executes the test and other jobs in the data processing system in order of their queued priority at their respective launch times by launching higher priority jobs before lower priority jobs, and drops the lowest priority test jobs at the bottom of the queue from the queue as the queue grows larger than its buffer size, wherein the dropped test jobs are not launched by the data processing system; and wherein execution of each of the test jobs by the data processing system does not cause a load to a total workload capacity of the data processing system, wherein execution of each of the other jobs by the data processing system causes a load to the total workload capacity of the data processing system, and wherein all of the other jobs may be executed within the total workload capacity of the data processing system when the lowest priority test jobs at the bottom of the queue are dropped from the queue and not launched by the data processing system as the queue grows larger than its buffer size.

12. The article of manufacture of claim 11, wherein the scheduling system further estimates a volume of the higher priority jobs that is sufficient to keep the data processing system busy within the total workload capacity of the data processing system, and drops lower queued jobs from the queue that exceed the estimated volume of the higher priority jobs.

13. The article of manufacture of claim 12, wherein execution of each of the test jobs by the data processing system causes the data processing system to wait for a wait time interval before proceeding to execute a next job of the queued jobs.

14. The article of manufacture of claim 13, wherein the lowest priority of the scheduled test jobs is a smallest priority value in the scheduling system.

15. A system, comprising:
a processing unit;
a computer readable memory; and
a computer-readable storage medium;
wherein the processing unit, when executing program instructions stored on the computer-readable storage medium via the computer readable memory:
determines at an end of an analysis time range period a number of a plurality of test jobs executed within the analysis time range period by a data processing system, wherein the test jobs are each scheduled by a scheduling system for execution by the data processing system at different periodic interval launch times within the analysis time range period and have a lowest priority within said scheduling system, and wherein a plurality of other jobs are scheduled in the scheduling system for execution by the data processing system within the analysis time range period and each of the other jobs have priorities that are higher than the lowest priority of the test jobs; and issues a performance decrease warning if the determined number of the scheduled test jobs executed during the analysis time range period is lower than a first predetermined threshold number that is equal to or less than the total scheduled number of the plurality of test jobs; and wherein the scheduling system adds each of the test jobs and the other jobs to a queue as a function of relative job priority by pushing higher priority jobs upward over lower priority jobs in the queue and thereby pushing each test job to a bottom of the queue, executes the test and the other jobs in the data processing system in order of their queued priority by launching higher priority jobs before lower priority jobs, and drops the lowest priority test jobs at the bottom of the queue from the queue as the queue grows larger than its buffer size, wherein the dropped test jobs are not launched by the data processing system; and wherein execution of each of the test jobs by the data processing system does not cause a load to a total workload capacity of the data processing system, wherein execution of each of the other jobs by the data processing system causes a load to the total workload capacity of the data processing system, and wherein all of the other jobs may be executed within the total workload capacity of the data processing system when the lowest priority test jobs at the bottom of the queue are dropped from the queue and not launched by the data processing system as the queue grows larger than its buffer size.

16. The system of claim 15, wherein the lowest priority of the scheduled test jobs is a smallest priority value in the scheduling system.

17. The system of claim 16 wherein each execution of a job by the data processing system is recorded in a job execution log file, and wherein the processing unit, when executing program instructions stored on the computer-readable storage medium via the computer readable memory, further determines the number of the scheduled test jobs executed within the analysis time range period by counting a number of the test jobs listed as executed in the job execution log file.

* * * * *